Patented Apr. 29, 1947

2,419,931

UNITED STATES PATENT OFFICE 2,419,931

METHOD OF PRODUCING MAGNESIUM CYANIDE

Albert R. Frank, New York, N. Y., and Robert B. Booth, Springdale, Conn., assignors to American Cyanamid Company, New York, N. Y., a corporation of Maine No Drawing. Application November 30, 1944, Serial No. 566,020

5 Claims. (Cl. 23—79)

The present invention relates to the production of magnesium cyanide, and more particularly to a method of preparing the compound in a substantially pure form.

Magnesium cyanide is adapted for various uses, including fumigation for the control and extermination of insects and allied pests. For fumigation, the compound is exposed to the atmosphere. The decomposition which takes place releases hydrocyanic acid rapidly and in copious volume.

It has been discovered that magnesium cyanide may be readily prepared by bringing together magnesium metal and hydrocyanic acid in the presence of liquid ammonia, both preferably substantially anhydrous, separating the thus formed magnesium cyanide ammoniate compound from the liquid mixture, and deammoniating the magnesium cyanide ammoniate to produce the desired magnesium cyanide.

In the process, the liquid ammonia not only supplies the ammonia content for the magnesium cyanide ammoniate compound but also serves as the vehicle for the reaction. It is important that ammonia be used in excess of the hydrocyanic acid. The latter is known to be subject to azulmic decomposition in the presence of an alkali, and ammonium cyanide is of such an alkaline nature as will cause such decomposition. However, ammonium cyanide is reasonably stable in the presence of excess ammonia. Therefore, it is important that all the hydrocyanic acid added as such be converted to ammonium cyanide while leaving an excess of ammonia.

The operation may be conducted by adding magnesium metal in either the pure state or as an alloy, preferably in finely divided form such as powder, or in the form of filings, turnings, ribbon, etc., to liquid ammonia to which has been added the hydrocyanic acid in an amount insufficient to convert all the ammonia to ammonium cyanide. The magnesium is thus converted to magnesium cyanide ammoniate having generally the formula $Mg(CN)_2 \cdot 2NH_3$ which precipitates from the menstruum containing free ammonia and may be readily recovered by filtration.

Where the magnesium cyanide ammoniate is formed from pure or substantially pure magnesium it is then deammoniated by heating to produce the substantially pure magnesium cyanide. A temperature of from 180° C. to 230° C. is preferred for rapid separation of the ammonia. Temperatures within the range of 150° C. to 350° C. are feasible. However, care must be taken at the higher temperatures to avoid decomposition of the magnesium cyanide. The deammoniation may be carried out by heating the ammoniate product under a partial vacuum to avoid the contact of air and particularly moisture, and to facilitate the removal of the evolved ammonia.

Where a magnesium alloy is used the final product may be of varying composition depending upon the composition of the alloy used. For instance, typical magnesium alloys contain zinc, copper, aluminum, iron, manganese and silicon. Zinc also forms a cyanide compound under the above circumstances which is soluble in the liquid ammonia. Zinc cyanide may therefore be recovered from the filtrate. Copper is slightly soluble in liquid ammonia and some of it therefore will find its way into the filtrate as a blue green soluble complex. Any undissolved copper will of course contaminate the filtered precipitate. Aluminum, iron, manganese and silicon are substantially unreactive with ammonia, hydrocyanic acid and ammonium cyanide under the above circumstances and hence will also contaminate the filtered product. Thus when such alloys are used the final magnesium cyanide will be of less purity and grade than if a purer magnesium were used. However, these contaminants are innocuous for most uses to which the magnesium cyanide is applied.

The following examples will illustrate the invention in greater detail. Parts indicated are by weight unless otherwise stated.

Example 1

1.93 parts of magnesium metal powder, 80–100 mesh in particle size, were added slowly to 250 parts by volume of liquid ammonia in which there were dissolved 4.75 parts of hydrocyanic acid at substantially −30° C. and without cooling. Reaction took place immediately as evidenced by the evolution of gas at the surface of the ammonia. The mixture was stirred for 3.5 hours at atmospheric pressure and the volume maintained during this period by occasional additions of liquid ammonia. The resulting suspension of magnesium cyanide ammoniate crystals in the liquid ammonia was filtered, and the crystals on the filter were washed with 100 parts by volume of liquid ammonia. The grayish-white crystals of magnesium cyanide ammoniate were then heated under a partial vacuum for 3 hours at 180° C. The remaining product was a light gray powder, analyzing 94.2% magnesium cyanide.

Example 2

Example 1 was repeated with the exception that the stirring period was 2 hours. The product after deammoniation analyzed 90.7% magnesium cyanide.

Example 3

The procedure of Example 1 was repeated using 2.1 parts of magnesium metal powder, 200 mesh in particle size, and a stirring period of 3 hours. The product after deammoniation analyzed 94.7% magnesium cyanide.

Example 4

Example 1 was repeated with the exception that the hydrocyanic acid was passed slowly into a suspension of the magnesium metal powder in the liquid ammonia. The product after deammoniation analyzed 93.6% magnesium cyanide.

Example 5

2.21 parts of a magnesium alloy (87.5% magnesium, 3.47% zinc, 7.95% aluminum, 0.09% copper, 0.04% iron, 0.22% manganese, 0.73% silicon) in the form of turnings, 3-6 mesh in particle size, were added slowly to 350 parts by volume of liquid ammonia in which there were dissolved 4.9 parts of hydrocyanic acid. The mixture was stirred for 4 hours and filtered. The crystalline product on the filter was washed with liquid ammonia and then heated under vacuum for 4 hours at 220° C. The remaining product contaminated with solids from the reaction mixture analyzed 89.5% magnesium cyanide.

While in the above examples the reaction is carried out at atmospheric pressures and comparatively low temperatures, the reaction will proceed faster at higher temperatures and requisite pressures.

The operation as described, affords a convenient and relatively inexpensive process for producing high grade magnesium cyanide.

While the invention has been described with particular reference to specific embodiments it is to be understood that it is not to be limited thereto, but is to be construed broadly and restricted solely by the scope of the appended claims.

We claim:

1. A method of producing magnesium cyanide which includes the steps of bringing together magnesium metal and hydrocyanic acid in the presence of liquid ammonia, separating the thus formed magnesium cyanide ammoniate from the liquid mixture, and deammoniating the magnesium cyanide ammoniate.

2. The method of claim 1 in which the magnesium cyanide ammoniate is deammoniated at a temperature within the range of 150–350° C.

3. A method of producing magnesium cyanide which includes the steps of dissolving magnesium metal in a mixture of hydrocyanic acid and liquid ammonia, separating the precipitate and heating it under vacuum at a temperature within the range of 180–230° C.

4. The method of claim 3 in which the ammonia is maintained in excess.

5. The method of claim 1 in which the magnesium is in the form of an alloy.

ALBERT R. FRANK.
ROBERT B. BOOTH.

REFERENCES CITED

The following references are of record in the file of this patent:

UNITED STATES PATENTS

| Number | Name | Date |
|---|---|---|
| 1,609,038 | Olberg | Nov. 30, 1926 |

FOREIGN PATENTS

| Number | Country | Date |
|---|---|---|
| 525,185 | German | May 20, 1931 |

OTHER REFERENCES

Mellor, "Inorganic and Theoretical Chemistry," vol. 4, page 269, Longmans, London (1923).